US010726826B2

(12) United States Patent
Fernandez et al.

(10) Patent No.: US 10,726,826 B2
(45) Date of Patent: Jul. 28, 2020

(54) VOICE-TRANSFORMATION BASED DATA AUGMENTATION FOR PROSODIC CLASSIFICATION

(71) Applicant: International Business Machines Corporation, Armonk, NY (US)

(72) Inventors: Raul Fernandez, New York, NY (US); Andrew Rosenberg, Brooklyn, NY (US); Alexander Sorin, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 15/911,157

(22) Filed: Mar. 4, 2018

(65) Prior Publication Data
US 2019/0272818 A1 Sep. 5, 2019

(51) Int. Cl.
*G10L 13/10* (2013.01)
*G10L 13/033* (2013.01)
*G10L 13/047* (2013.01)
*G06N 20/00* (2019.01)

(52) U.S. Cl.
CPC .............. *G10L 13/10* (2013.01); *G06N 20/00* (2019.01); *G10L 13/0335* (2013.01); *G10L 13/047* (2013.01)

(58) Field of Classification Search
USPC ...................................................... 704/1–504
See application file for complete search history.

(56) References Cited

U.S. PATENT DOCUMENTS

| 7,035,791 | B2 | 4/2006 | Chazan et al. |
| 7,962,341 | B2 | 6/2011 | Braunschweiler |
| 8,620,662 | B2 * | 12/2013 | Bellegarda ............. G10L 13/06 704/260 |
| 8,660,849 | B2 * | 2/2014 | Gruber ................. G10L 15/183 704/275 |
| 8,670,979 | B2 * | 3/2014 | Gruber .................. G10L 13/02 704/9 |
| 8,706,503 | B2 * | 4/2014 | Cheyer ..................... G06F 9/54 704/275 |

(Continued)

OTHER PUBLICATIONS

"Grace Period Disclosure under 35 USC 102(b)(1)(A): Voice-Transformation-Based Data Augmentation for Prosodic Classification", Raul Fernandez, Andrew Rosenberg, Alexander Sorin, Bhuvana Ramabhadran, Ron Hoory, made publicly available Mar. 5, 2017, 5 pages.

*Primary Examiner* — Marcus T Riley
(74) *Attorney, Agent, or Firm* — Feb R. Cabrasawan; Amy J. Pattillo

(57) ABSTRACT

A computer system receives a training set of voice data captured from one or more speakers and classified with one or more categorical prosodic labels according to one or more prosodic categories. The computer system transforms the voice data of the training set while preserving one or more portions of the voice data that determine the one or more categorical prosodic labels to automatically form a new training set of voice data automatically classified with the one or more categorical prosodic labels according to the one or more prosodic categories. The computer system augments a database comprising the training set with the new training set for training a speech model of an artificial intelligence system.

16 Claims, 10 Drawing Sheets

(56) References Cited

U.S. PATENT DOCUMENTS

| | | | | |
|---|---|---|---|---|
| 8,731,942 B2* | 5/2014 | Cheyer | G10L 15/26 | 704/275 |
| 8,799,000 B2* | 8/2014 | Guzzoni | G06F 16/3344 | 704/270.1 |
| 8,892,446 B2* | 11/2014 | Cheyer | G06F 40/279 | 704/275 |
| 8,903,716 B2* | 12/2014 | Chen | H04M 1/72563 | 704/9 |
| 8,930,191 B2* | 1/2015 | Gruber | B60K 35/00 | 704/257 |
| 8,935,167 B2* | 1/2015 | Bellegarda | G10L 15/063 | 704/231 |
| 8,942,986 B2* | 1/2015 | Cheyer | G06F 40/40 | 704/275 |
| 9,262,612 B2* | 2/2016 | Cheyer | G06F 21/32 | |
| 9,286,886 B2 | 3/2016 | Minnis et al. | | |
| 10,102,359 B2* | 10/2018 | Cheyer | G06F 21/32 | |
| 10,283,110 B2* | 5/2019 | Bellegarda | G10L 15/08 | |
| 10,453,479 B2* | 10/2019 | Wilhelms-Tricarico | G10L 13/04 | |
| 10,496,753 B2* | 12/2019 | Gruber | G06F 40/35 | |
| 2008/0059190 A1* | 3/2008 | Chu | G10L 13/06 | 704/258 |
| 2013/0262096 A1* | 10/2013 | Wilhelms-Tricarico | G10L 25/30 | 704/202 |
| 2017/0200446 A1 | 7/2017 | Cui et al. | | |
| 2019/0272818 A1* | 9/2019 | Fernandez | G10L 13/10 | |

\* cited by examiner

| Task | Speaker | Baseline | Augmented | |
|---|---|---|---|---|
| Phrase Bdry. | F1 (3,681) | 7.39 | 7.06 (4.47) | 570 |
| | F2 (12,697) | 7.54 | 7.08 (6.10) | |
| | F3 (2,733) | 6.99 | 5.74 (17.88) | |
| | M1 (4,955) | 7.09 | 5.71 (19.46) | |
| | M2 (3,537) | 7.63 | 7.15 (6.29) | |
| | M3 (1,935) | 4.55 | 4.70 (-3.30) | |
| | WAvg. | 7.21 | 6.58 (8.74) | |
| Pitch Accent | F1 | 12.47 | 12.66 (-1.52) | |
| | F2 | 14.54 | 13.71 (5.71) | |
| | F3 | 13.50 | 12.44 (7.85) | |
| | M1 | 13.65 | 13.57 (0.59) | |
| | M2 | 12.61 | 11.42 (9.44) | |
| | M3 | 12.71 | 11.89 (6.45) | |
| | WAvg. | 13.69 | 13.04 (4.75) | |

VOICE-TRANSFORMATION BASED DATA AUGMENTATION FOR PROSODIC CLASSIFICATION

BACKGROUND

1. Technical Field

This invention relates in general to computing systems and more particularly to prosodic classification.

2. Description of the Related Art

The meaning of human speech is impacted by both the words spoken and the tune and rhythm of the speech. Prosody refers to aspects of the tune and rhythm of speech including vocal pitch, loudness, and rhythm.

BRIEF SUMMARY

In one embodiment, a method is directed to receiving, by a computer system, a training set of voice data captured from one or more speakers and classified with one or more categorical prosodic labels according to one or more prosodic categories. The method is directed to transforming, by the computer system, the voice data of the training set while preserving one or more portions of the voice data that determine the one or more categorical prosodic labels to automatically form a new training set of voice data automatically classified with the one or more categorical prosodic labels according to the one or more prosodic categories by: extracting, by the computer system, a pitch contour from the voice data at a constant frame rate; analyzing, by the computer system, one or more voiced frames of the voice data at the constant frame rate while ignoring unvoiced frames; using, by the computer system, a short time window to perform iterative inverse filtering of the one or more voiced frames to separate glottal excitation from vocal tract in one or more voiced regions; parameterizing, by the computer system, the glottal excitation using a model of a glottal pulse and a high-pass filtered Gaussian process representing aspiration noise; and smoothing, by the computer system, one or more temporal trajectories of one or more parameters of the parameterized glottal excitation within a moving average window to reduce fluctuations due to extraction error. The method is directed to augmenting, by the computer system, a database comprising the training set with the new training set for training a speech model of an artificial intelligence system.

In another embodiment, a computer system comprises one or more processors, one or more computer-readable memories, one or more computer-readable, tangible storage devices. The computer system comprises program instructions, stored on at least one of the one or more storage devices for execution by at least one of the one or more processors via at least one of the one or more memories, to receive a training set of voice data captured from one or more speakers and classified with one or more categorical prosodic labels according to one or more prosodic categories. The computer system comprises program instructions, stored on at least one of the one or more storage devices for execution by at least one of the one or more processors via at least one of the one or more memories, to transform the voice data of the training set while preserving one or more portions of the voice data that determine the one or more categorical prosodic labels to automatically form a new training set of voice data automatically classified with the one or more categorical prosodic labels according to the one or more prosodic categories by: program instructions, stored on at least one of the one or more storage devices for execution by at least one of the one or more processors via at least one of the one or more memories, to extract a pitch contour from the voice data at a constant frame rate; program instructions, stored on at least one of the one or more storage devices for execution by at least one of the one or more processors via at least one of the one or more memories, to analyze one or more voiced frames of the voice data at the constant frame rate while ignoring unvoiced frames; program instructions, stored on at least one of the one or more storage devices for execution by at least one of the one or more processors via at least one of the one or more memories, to use a short time window to perform iterative inverse filtering of the one or more voiced frames to separate glottal excitation from vocal tract in one or more voiced regions; program instructions, stored on at least one of the one or more storage devices for execution by at least one of the one or more processors via at least one of the one or more memories, to parameterize the glottal excitation using a model of a glottal pulse and a high-pass filtered Gaussian process representing aspiration noise; and program instructions, stored on at least one of the one or more storage devices for execution by at least one of the one or more processors via at least one of the one or more memories, to smooth one or more temporal trajectories of one or more parameters of the parameterized glottal excitation within a moving average window to reduce fluctuations due to extraction errors. The computer system comprises program instructions, stored on at least one of the one or more storage devices for execution by at least one of the one or more processors via at least one of the one or more memories, to augment a database comprising the training set with the new training set for training a speech model of an artificial intelligence system.

In another embodiment, a computer program product comprises a computer readable storage medium having program instructions embodied therewith, wherein the computer readable storage medium is not a transitory signal per se. The program instructions executable by a computer to cause the computer to receive, by a computer, a training set of voice data captured from one or more speakers and classified with one or more categorical prosodic labels according to one or more prosodic categories. The program instructions executable by a computer to cause the computer to transform, by the computer, the voice data of the training set while preserving one or more portions of the voice data that determine the one or more categorical prosodic labels to automatically form a new training set of voice data automatically classified with the one or more categorical prosodic labels according to the one or more prosodic categories by: extracting a pitch contour from the voice data at a constant frame rate; analyzing one or more voiced frames of the voice data at the constant frame rate while ignoring unvoiced frames; using a short time window to perform iterative inverse filtering of the one or more voiced frames to separate glottal excitation from vocal tract in one or more voiced regions; parameterizing the glottal excitation using a model of a glottal pulse and a high-pass filtered Gaussian process representing aspiration noise; and smoothing one or more temporal trajectories of one or more parameters of the parameterized glottal excitation within a moving average window to reduce fluctuations due to extraction errors. The program instructions executable by a computer to cause the computer to augment, by the computer, a database comprising the training set with the new training set for training a speech model of an artificial intelligence system.

BRIEF DESCRIPTION OF THE SEVERAL
VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

Figure 13:
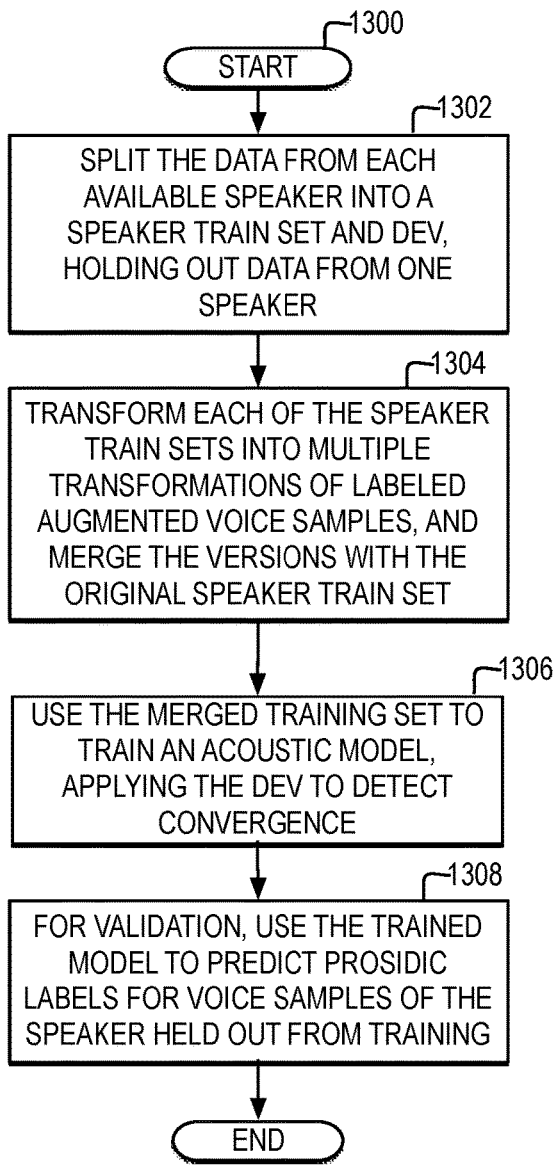
Figure 14:
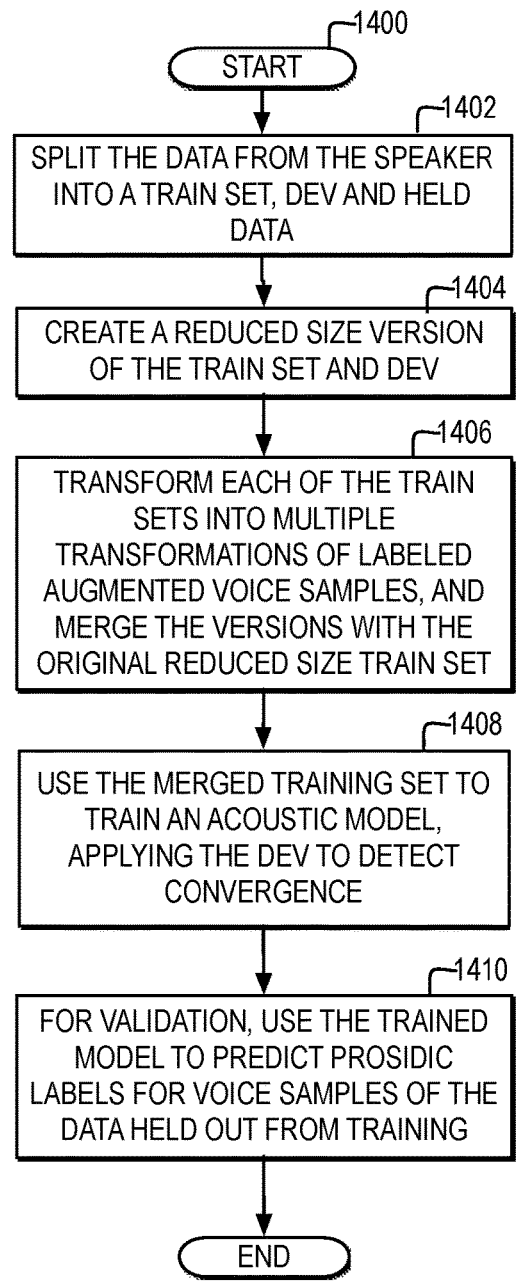

FIG. 13 is a high-level logic flowchart illustrating a process and computer program for controlling a speaker independent trained acoustic model using prosodic labeled voice samples and prosodic labeled augmented voice samples; and FIG. 14 is a high-level logic flowchart illustrating a process and computer program for controlling a speaker dependent trained acoustic model using prosodic labeled voice samples and prosodic labeled augmented voice samples.

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
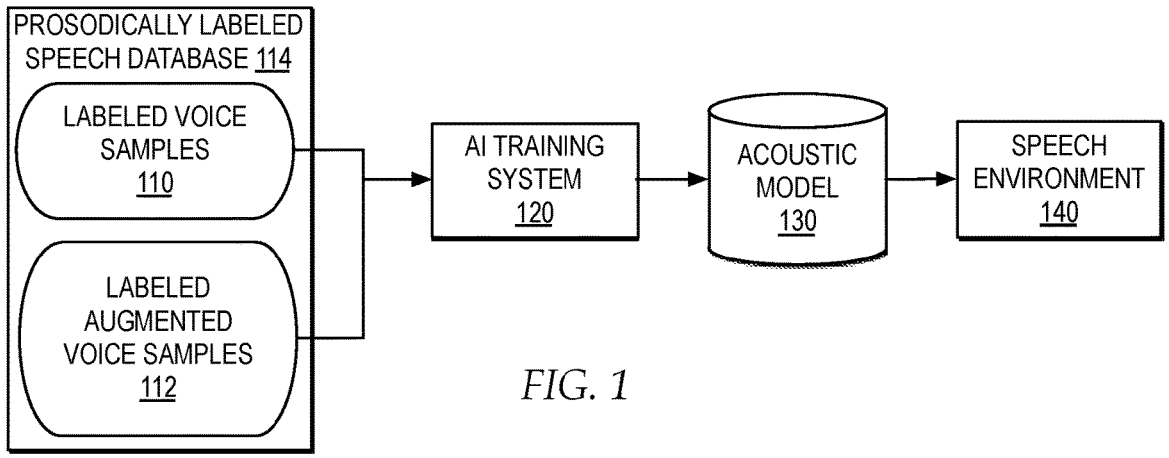
FIG. 1 is a block diagram illustrating one example of an artificial intelligence system trained using prosodic labeled voice samples and prosodic labeled augmented voice samples.

FIG. 1 illustrates a block diagram of one example of an artificial intelligence system trained using prosodic labeled voice samples and prosodic labeled augmented voice samples.

In one example, prosody may describe the way words are spoken. In one example, speech recognition may include identifying, from speech, both the lexical identity of the words in the speech and the prosody of the speech as the words are spoken. In one example, prosody may refer to one or more performance qualities of speech that are separate from the communication or understanding of a word that is said. In one example, prosodic categories may include one or more of, but are not limited to, pitch, intensity, rhythm, stress, and phrasing. In one example, linguistic information in speech may refer to the direct expression of meaning, paralinguistic information in speech may indicate attitude or membership of a speech community, and non-linguistic information in speech may indicate something about a speaker's vocal physiology, state of health, or emotional state.

In one example, one or more types of input received by an artificial intelligence (AI) training system 120 may include training data received from a prosodically labeled speech database 114. In one example, prosodically labeled speech database 114 may be used in one or more applications including, but not limited to, multiple types of prosodic research or development of speech technologies that rely on a labeled corpora or corpus of voice samples for training. In one example, speech technologies may include studying intonation variation in a multi-speaker corpus and developing algorithms for phrase assignment in a text-to-speech system. For example, prosodically labeled speech database 114 may by applied when training a data-driven phrasing module for converting text-to-speech.

For example, training system 120 may receive one or more types of training data, such as labeled voice samples within prosodically labeled speech database 114, which are applied to train an acoustic model 130, within a neural network, deep neural network, or bi-directional recurrent neural network (Bi-RNN). In one example, acoustic model 130 may be applied in one or more speech environments for providing speech technology-based services, such as speech environment 140.

In one example, prosodically labeled speech database 114 may include one or more of labeled voice samples 110 and labeled augmented voice samples 112. In one example, labeled voice samples 110 and labeled augmented voice samples 112 may both represent voice samples that are labeled with classification labels for one or more prosodic categories.

In one example, labeled voice samples 110 may represent voice samples that have been labeled by a user within a fully supervised or semi-supervised framework that relies upon some amount of manual user selection, annotation or classification of voice data to generated labeled voice samples 110. In one example, labeled voice samples 110 may include labels for prosodic categories including, but not limited to, pitch, intensity, rhythm, stress, and phrasing.

In one example, AI training system 120 may also be trained using labeled augmented voice samples 112 in prosodically labeled speech database 114. In one example, labeled augmented voice samples 112 may represent augmented versions of labeled voice samples 110, in which the underlying voice samples are automatically augmented through a transformation to generate an additional, augmented labeled voice sample that creates additional observations that are distinct in feature space, while preserving the portions of the voice sample that determine at least one previously assigned prosodic label, without requiring additional user supervision of the labeling process. For example, labeled voice samples 110 may include multiple labels, for multiple prosodic label categories, however, labeled augmented voice samples 112 may only preserve the portions of the voice sample that determine a particular selection of prosodic label categories. In one example, labeled augmented voice samples 112 may represent augmented versions of training data in labeled voice samples 110 that use label-preserving voice transformations that respect the same sequence of categorical prosodic labels of interest, such as pitch accents and into national phrase boundaries, but are also different enough from the underlying voice sample data in labeled voice samples 110 to improve the amount and variety of training data available to train acoustic model 130.

In one example, the accuracy of speech recognition within speech environment 140 deploying acoustic model 130 may be impacted by the amount and variability of the corpus of training data used by AI training system 120 to train acoustic model 130. In one example, generating any amount of labeled voice samples 110 in prosodically labeled speech database 114 may be time consuming and expensive, requiring some level of fully supervised or semi-supervised human selection to label the underlying voice samples to train acoustic model 130. As a result, an entity may desire to minimize the number of entries in labeled voice samples 110 to a small or moderate number of entries. When the number of samples in labeled voice samples 110 is low, the number of speakers represented or the variety of data represented for training acoustic model 130 is also low. In addition, an entity generating labeled voice samples 110 may not have access to voice samples from a wide variety of speakers. If acoustic model 130 is trained on labeled voice samples 110 with only a single or a few speakers, acoustic model 130 may be limited in ability to generalize outside the speakers observed in the training pool in labeled voice samples 110.

In one example, by updating prosodically labeled speech database 114 to also include labeled augmented voice samples 112, the combined corpus of labeled voice samples 110 and labeled augmented voice samples 112 may enable AI training system 120 to improve voice classifications in acoustic model 130, without requiring additional human interaction time to generate independent labeled augmented voice samples 112, improving both the performance of acoustic model 130 by increasing the number of voice samples and improving the generalization of the classification by acoustic model 130 beyond the speakers represented in labeled voice samples 110, through the augmented voice samples represented in labeled augmented voice samples 112. In particular, in an operating environment in which the data set available in labeled voice samples 110 is limited, by automatically generating and applying labeled augmented voice samples 112 alongside labeled voice samples 110, the performance of acoustic model 130 is improved in a variety of tasks within speech environment 140.

Figure 2:
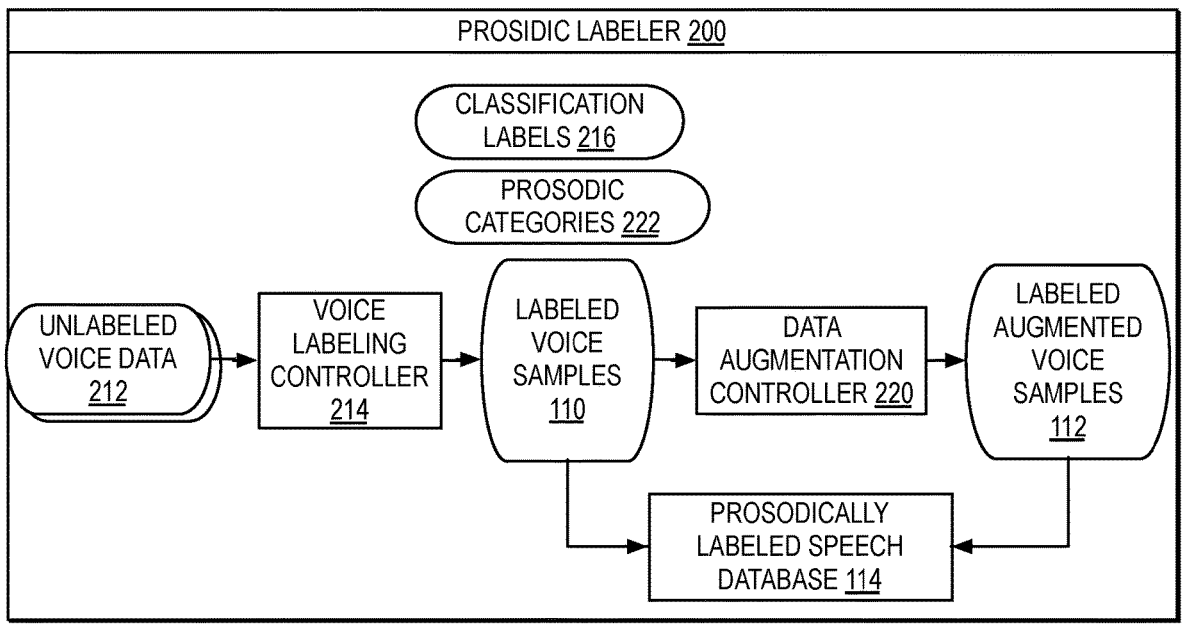
FIG. 2 is a block diagram illustrating one example of a prosodic labeler system that augments prosodic labeled voice samples to generate additional prosodic labeled augmented voice samples for artificial intelligence training of an acoustic model.

FIG. 2 illustrates a block diagram of one example of a prosodic labeler system that augments prosodic labeled voice samples to generate additional prosodic labeled augmented voice samples for artificial intelligence training of an acoustic model.

In one example, a prosodic labeler 200 may implement a voice labeling controller 214 for receiving one or more samples of unlabeled voice data, such as unlabeled voice data 212, and labeling each of the samples of unlabeled voice data with one or more classification labels, such as classification labels 216, for one or more prosodic categories 222, for creating labeled voice samples 110.

In one example, voice labeling controller 214 may operate within a fully supervised or semi-supervised framework that relies upon some amount of manual selection, annotation, and classification of unlabeled voice data 212 to generate labeled voice samples 110, by humans. For example, voice labeling controller 214 may operate within a fully supervised framework in which voice labeling controller 214 may prompt a user to both select the selections of speech that match prosodic categories 222 and to identify a particular classification label, from among classification labels 216, to assign to the identified selections of speech. In another example, voice labeling controller 214 may operate with a semi-supervised framework in which voice labeling controller 214 may automatically analyze and identify selections of speech that match prosodic categories 222 of speech within unlabeled voice data 212, but also prompt a user to manually select and assign a particular classification label, from among classification labels 216, to assign to the identified selections of speech. Further, in another semi-supervised framework, voice labeling controller 214 may automatically analyze and identify selections of speech that match prosodic categories 222 of speech within unlabeled voice data 212 and analyze the selections of speech, based on a corpus of previously labeled voice data, to automatically identify a particular classification label, from among classification labels 216, to assign to the identified selections of speech, and may perform additional manual verification by prompting user to indicate whether the automated identification of the particular classification label is correct.

In one example, prosodic labeler 200, and additional or alternate prosodic labelers, may generate entries in prosodically labeled speech database 114 from a corpus of labeled voice samples, such as labeled voice samples 110 and from a corpus of labeled augmented voice samples 112, automatically generated from labeled voice samples 110. In one example, building a corpus of labeled voice samples 110 with classification labels for prosodically labeled speech database 114 may be time-consuming and expensive, depending on the size of the corpus of labeled speech, the number of categories labeled, and the amount of automation applied. Given the time and expense of generating labeled voice samples, a user who develops labeled voice samples may only release the samples in a proprietary, protected trained model, rather than releasing the underlying labeled voice samples in prosodically labeled speech database 114. Further, even if a user releases labeled voice samples 110 for open-source use by others, other users accessing labeled voice samples 110 may still need to run tests on the data to ensure that classification labels have been accurately assigned, which may increase the expense and time associated with use of the labeled voice samples.

In addition, in building a corpus of labeled voice samples 110 with classification labels for prosodically labeled speech database 114, if a smaller amount of labeled voice samples is gathered in prosodically labeled speech database 114, models that are trained based on a pool collected from a smaller number of different speakers may have, or be perceived to have, limited ability in applications that require generalization outside the voices of the speakers observed in the training pool. To improve the accuracy of speech technologies developed based on prosodically labeled speech database 114, multiple corpus across a larger number of speakers may be required because prosodic classifier labels trained on one corpus, or in a speaker-dependent manner, may not generalize as well in multiple applications.

In one example, prosodic labeler 200 may improve the amount and variety of labeled voice samples in prosodically labeled speech database 114, automatically, through a data augmentation controller 220. In one example, data augmentation controller 220 augments an original selection of labeled voice samples from labeled voice samples 110 to generate labeled augmented voice samples 112, as additional training data for prosodically labeled speech database 114, without requiring additional unlabeled voice data 212, additional user input, or additional analysis and labeling of unlabeled voice data 212 by voice labeling controller 214. In one example, data augmentation controller 220 may increase the corpus of prosodically labeled speech database 114 by analyzing labeled voice samples 110 and generating labeled augmented voice samples 112, as an augmented version of labeled voice samples 110 using label-preserving voice transformations.

In particular, in one example, data augmentation controller 220 may generate an augmented version of labeled voice samples 110, as labeled augmented voice samples 112, to create additional observations about a labeled voice sample that are distinct in feature space, while retaining a selection of categorical prosodic classification labels. In one example, data augmentation controller 220 may first identify prosodic categories of interest from among prosodic categories 222, such as binary prosodic labels indicating whether a word receives a pitch accent and is followed by an intonation phrase boundary. In one example, data augmentation controller 220 may then apply global acoustic transformations that alter the global, fundamental frequency, the speaker's vocal tract, and the voice quality within labeled voice samples 110 in a way that preserves the local relative patterns of pitch followed by an intonation phrase boundary of a particular duration that are associated with the categorical prosodic classification labels previously applied by voice labeling controller 214 in labeled voice samples 110. Data augmentation controller 220 generates labeled augmented voice samples 112, which when combined with labeled voice samples 110 in prosodically labeled speech database 114, automatically generate an N-fold increase of the number of samples of labeled voice samples in prosodically labeled speech database 114, without requiring additional human annotation or supervision to generate the additional labeled augmented voice samples.

In particular, in one example, data augmentation controller 220 may improve the performance of prosodic labeler 200 when only a small or moderate amount of labeled voice samples 110 are available and improve the generalization of the classification technique performed by prosodic labeler 200. By generating multiple versions of labeled voice samples 110 that are distinct enough from the original data in the original voice pattern, yet include the same sequence of categorical prosodic labels, data augmentation controller 220 automates augmenting the small or moderate amount of labeled corpus of voice samples in prosodically labeled speech database 114 to a level that improves performance of models that are trained using prosodically labeled speech database 114, at a minimal cost and without requiring additional human annotations and labeling of voice samples.

Figure 3:
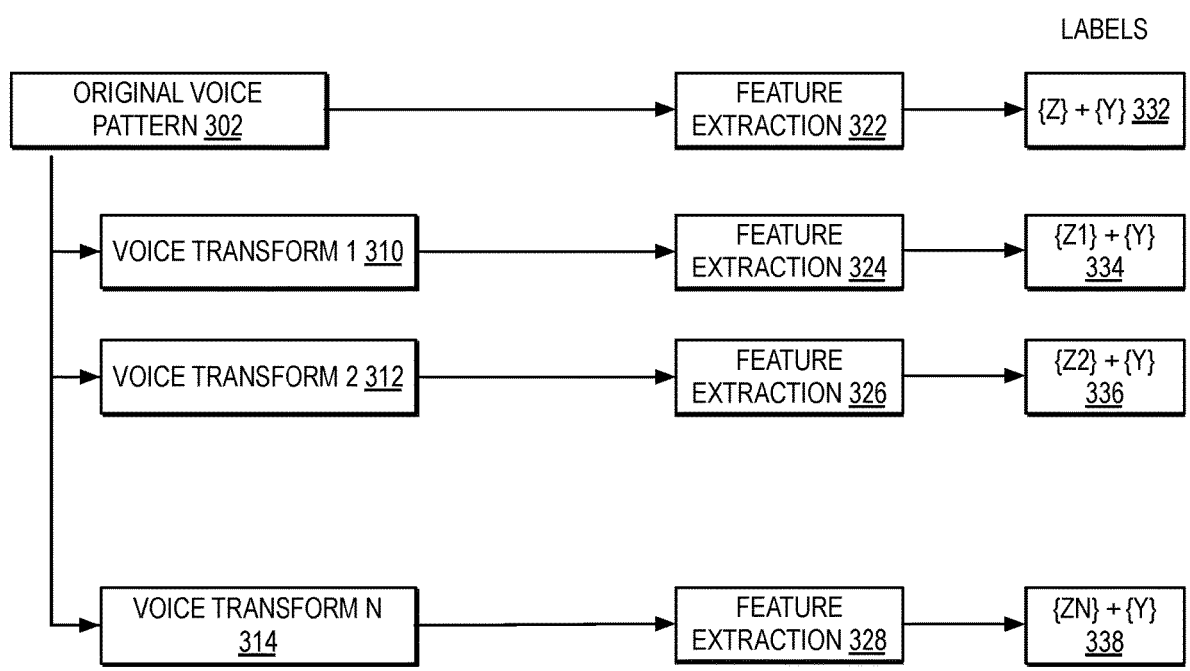
FIG. 3 is a block diagram illustrating a voice space transformation of a prosodic labeled voice sample by a data augmentation controller to generate prosodic labeled augmented voice samples.

FIG. 3 illustrates a block diagram of a voice space transformation of a prosodic labeled voice sample by a data augmentation controller to generate prosodic labeled augmented voice samples.

In one example, initially, voice labeling controller 214 may generate labeled voice samples 110 by identifying a feature extraction 322 from an original voice pattern 302 of unlabeled voice data 212, where feature extraction 322 represents a portion of the voice pattern identified for a particular category from among prosodic categories 222. A user may enter or verify one or more labels for feature extraction 322, illustrated by a label "Z" and a label "Y". In one example, voice labeling controller 214 may store original voice pattern 302, with labels 332 applied, as labeled voice samples 110.

In one example, data augmentation controller 220 may transform original voice pattern 302, as labeled by labels 332, by applying one or more voice transform patterns, such as voice transform 1 310, voice transform 2 312, and voice transform N 314, while preserving local relative patterns of pitch and duration that are labeled by "Z1" and "Y" 334 for feature extraction 324, labeled by "Z2" and "Y" 336 for feature extraction 326, and labeled by "ZN" and "Y" 338 for feature extraction 328. In one example, each of the "Z1", "Z2", and "ZN" labels as associated with transformed replicas of original voice pattern 302, each paired with a unique sequence Y of target labels to be learned by AI training system 120 for classifying voice samples in acoustic model 130.

In one example, voice transform 1 310, voice transform 2 312, and voice transform N 314 may represent one or more types of voice transformations applied to original voice pattern 302 that modify one or more of the pitch baseline and range, vocal-tract and vocal source characteristics of the speakers to generate further training examples as labeled augmented voice samples 112 in prosodically labeled speech database 114.

Figure 4:
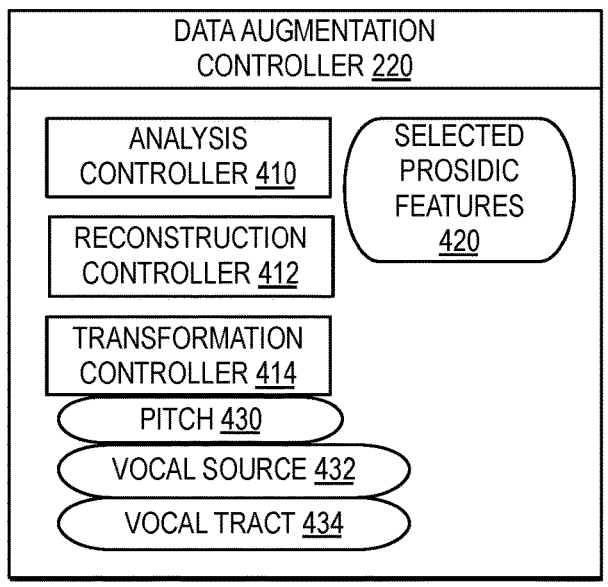
FIG. 4 is a block diagram illustrating one example of components of a data augmentation controller for transforming a prosodic labeled voice sample to automatically generate a prosodic labeled augmented voice sample.
Figure 4:
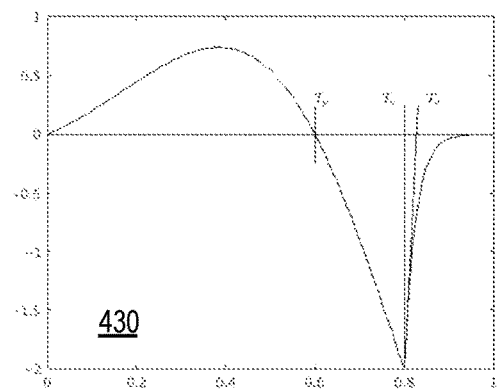

FIG. 4 illustrates a block diagram of one example of components of a data augmentation controller for transforming a prosodic labeled voice sample to automatically generate a prosodic labeled augmented voice sample.

In one example, data augmentation controller 220 may include one or more components for transforming labeled voice samples 110 into augmented voice samples 112. In one example, data augmentation controller 220 may include components of an analysis controller 410, a reconstruction controller 412, and a transformation controller 414.

In one example, analysis controller 410 may perform an extraction of one or more selected prosodic features 420 from an underlying voice sample in labeled voice samples 110. In one example, prosodic features 420 may specify a selection of prosodic categories from among prosodic categories 222. For example, analysis controller 410 may extract a prosodic feature of a pitch contour at a constant frame rate from an underlying voice sample in labeled voice samples 110. In one example, analysis controller 410 may analyze the voiced regions of speech at the same frame rate, ignoring unvoiced frames and using a short time window of 3.5 pitch cycles, perform iterative inverse filtering to separate glottal excitation from vocal tract. In one example, analysis controller 410 may parameterize the excitation signal using a Liljencrants-Fant (LF) model of a glottal pulse of 500 Hz high-pass filtered Gaussian process representing the aspiration noise, which represents the glottal source within the analysis window by a 3-parameter LF vector, plus aspiration noise level, and a gain factor. In one example, the vocal tract is represented by 40 Line-Spectral Frequencies (LSF). In one example, analysis controller 410 may smooth the temporal trajectories of all the parameters with a 7-frame moving average window to reduce fluctuations due to extraction errors.

In another example, analysis controller 410 may perform a parametric source-tract decomposition approach relying on the LF parameterization of the glottal flow. For example, analysis controller 410 may extract an F0 contour from original voice pattern 302, which represents an original or desired contour, at 5-ms frame rate analysis and analyze a waveform of original voice pattern 302 at the same rate. In one example, analysis controller 410 may skip unvoiced frames and analyze voiced frames using the Iterative Adaptive Inverse Filtering (IAIF) algorithm to yield vocal-tract and source components. Analysis controller 410 may model the source with a 3-parameter vector $\theta=[T_p,T_e,T_a]^T$, which parameterizes the LF fit to the glottal flow, plus aspiration noise level and gain factor. In one example, analysis controller 410 may generate the vocal tract, represented by 40 line spectral frequencies. In one example, analysis controller 410 may smooth the time trajectories of all the parameters with a frame long moving average window, as illustrated in graph 430.

In one example, reconstruction controller 412 may resynthesize contiguous voiced frames together to form contiguous voiced regions. Reconstruction controller 412 may interleave the voiced regions with the unvoiced regions, which have been preserved in raw sample form. First, reconstruction controller 412 may synthesize a voiced region for selected prosodic features 420, such as pitch, by generating a sequence of consecutive pitch cycle onsets according to a desired synthesis pitch contour. In one example, reconstruction controller 412 may next generate a sequence of glottal pulse cycles, scaled by a gain factor, and with added aspiration noise to generate the glottal-source and vocal-tract parameters associated with each pitch cycle by interpolating between the corresponding parameters associated with the cycle's surrounding edge frames. In addition, restriction controller 412 may then synthesize a voiced region by next generating a sequence of glottal pulses with each pulse multiplied by its corresponding gain factor. Restriction controller 412 may optionally synthesize a voiced region by next adding aspiration noise constructed for the entire voiced region by amplitude modulation of a 500-Hz-high-passed Gaussian noise signal. Restriction controller 412 may synthesize a voiced region by next converting the LSF parameters associated with each pitch cycle into auto-regression filter coefficients. Finally, restriction controller 412 may synthesize a voiced region by next interleaving voice and unvoiced regions using an overall-add procedure.

In one example, transformation controller 414 may manage transformations of original voice sample 302 while preserving one or more prosodic categories to obtain augmented, distinct version of original voice data in labeled voice samples 110 by introducing global modifications of the parameters extracted by analysis controller 410, within a range that corresponds to perceptually meaningful speech, before reconstruction by reconstruction controller 412. In addition, transformation controller 414 may manage pitch 430 through transposition and range scaling, such as by transposing the pitch level of the original speaker in labeled voice samples 110, with the speaker's pitch range further expanded or compressed.

The transformations performed by transformation controller 414 may have a property of being global in nature and preserve the relative local cues that speakers employ to signal prosodic prominence and phrasing. In one example, transformation controller 414 may control vocal source 432 through one or more types of controls. In one example, a first control of vocal source 432 may control interpolation between the actual LF parameter vector θ and a reference target user-provided vector of $\theta_{ref}$ through:

$$\hat{\theta}=(1-\alpha)\theta+\alpha\theta_{ref}$$

In another example, a second control of vocal source 432 may control interpolation of the actual LF parameter vector between two stylized pre-computed pulses corresponding to lax $(\theta_{\{l\}}=[0.5,0.9,0.099]^T$ and tense $(\theta_{\{t\}}=[0.1,0.15,0.0001]^T$ voice qualities through:

$$\hat{\theta} = \begin{cases} (1-\beta_{lt})\theta + \beta_{lt}\theta_l & \text{if } \beta_{lt} > 0 \\ (1-|\beta_{lt}|)\theta + |\beta_{lt}|\theta_l & \text{otherwise} \end{cases}$$

By transformation controller 414 applying transformations that are global in nature, such as vocal tract 434, transformation controller 414 may reassign the same original labels to the portion of replicated data from the original voice data in labeled voice samples 110 and use the augmented pairs as auxiliary data for better training acoustic model 130 and improving predictability and accuracy of acoustic model 130 in speech environment 140. For example, transformation controller 414 may control vocal tract 434 through LSF pairs mapped according to a transfer function specified by a piece-wise linear function between provided inflection points.

In one example, table 432 illustrates a summary of the different types of transforms that transformation controller 414 may perform, identified by "T1-T7", for performing the transforms illustrated by voice transform 1 310, voice transform 2 312, and voice transform N 314. In one example, each of the voice transforms in table 432 is illustrated as having a shift and range value for pitch $(f_0^{shift}, f_0^{range})$, multiple vocal transform map values (VTmap), a value for a glottal source $(\beta_{lt})$, and a value for a vocal tract $(\alpha, \theta_{ref})$. In one example, $f_0^{shift}$ may be specified in octaves, where a value of plus or minus 1 represents a shifting or lowering of the baseline pitch by an octave. In one example, $f_0^{range}$ may represent a multiplication factor to stretch or compress the pitch range. In one example, the pairs in VTmap may be reflected in kilohertz (kHz) and may represent the inflection points of a vocal-tract spline interpolating function.

In one example, in table 432, the transforms for "T1", "T2", and "T3" each apply a common vocal-tract transform, with different pitch and glottal transformations in the shift and range and glottal source values. In one example, in table 432, the transforms for "T4" leaves the vocal tract unchanged. In one example, in table 432, the transform for "T5" change both the vocal tract and vocal source, but using a different vocal-tract transform from "T1", "T2" and "T3". In one example, in table 432, "T6" and "T7" leave the glottal source unchanged.

Figure 5:
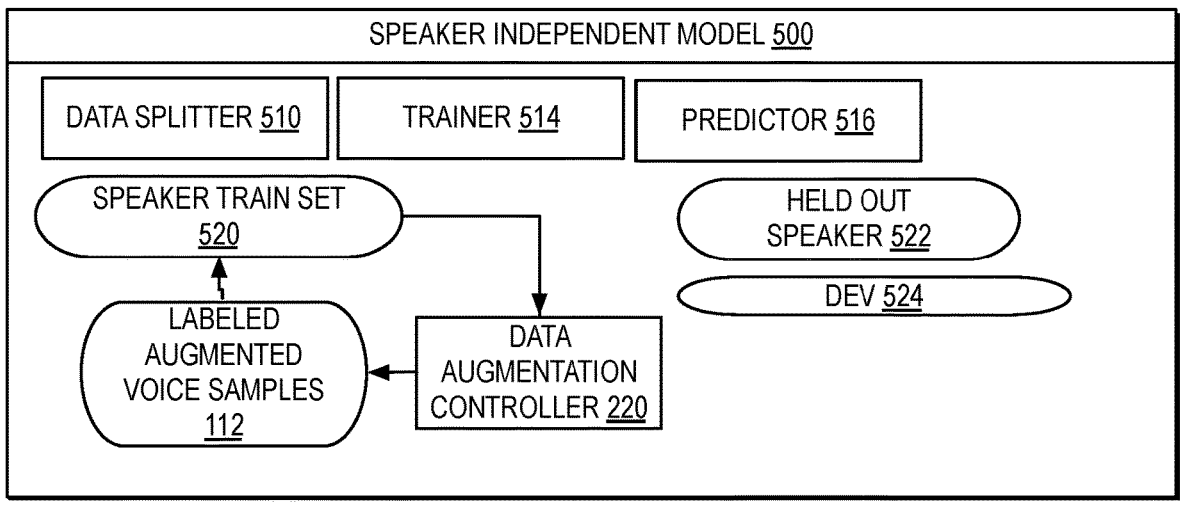
FIG. 5 is a block diagram illustrating one example of phases of a speaker independent model for training an acoustic model using both prosodic labeled voice samples and prosodic labeled augmented voice samples.

FIG. 5 illustrates a block diagram of one example of phases of a speaker independent model for training an acoustic model using both prosodic labeled voice samples and prosodic labeled augmented voice samples.

In one example, in considering an example where data augmentation controller 220 applies multiple independent transformations to an original, labeled voice pattern in labeled voice samples 110, to generate an augmented dataset of multiple versions in labeled augmented voice samples 112, from multiple speakers, speaker independent model 500 improves the generalization of training in acoustic model 130 in a multi-speaker case for speakers who are unseen in labeled voice samples 110.

For example, in a speaker-independent case managed by speaker independent model 500, unlabeled voice data 212 may a corpus of 9 hours of recorded audio from 6 different speakers. In one example, voice labeling controller 214 may manage manual annotation by one or more users of unlabeled voice data 212 to produce labeled voice samples 110 from the corpus of 9 hours of recorded audio from 6 different speakers, where pitch accents are collapsed into binary accented and unaccented prosodic categories 222, identified by classification labels 216, and phase boundaries identified in classification labels 216 correspond to full intonation-phrase boundaries with a break index of 4.

In one example, speaker independent model 500 may implement a data splitter 510 that splits the labeled voice samples from 5 of the 6 speakers in labeled voice samples 110 into speaker train set 520 and dev 524, such as 90% of the labeled voice samples from of the 6 speakers in speaker train set 520 and 10% of the labeled voice samples in dev 524. In addition, data splitter 510 also holds out labeled voice samples from at least one of the speakers in held out speaker 522. In one example, speaker independent model 500 may then apply data augmentation controller 220 to speaker train set 520 to transform each of the separate training sets of labeled voice samples 110 in speaker train set 520 into one or more transformed versions, as labeled augmented voice samples 112, and merge the transformed versions with each original training set of labeled voice samples in speaker train set 520, which reflects prosodically labeled speech database 114.

In addition, speaker independent model 500 may implement a trainer 514 for triggering AI training system 120 to train acoustic model 130 using the merged original and augmented training sets, in speaker train set 520. In one example, dev 524 may be applied by trainer 514 to monitor performance and diagnose the quality of training of acoustic model 130 to determine whether additional training is recommended or when to stop training acoustic model 130. In one example, trainer 514 may be implemented within a Bi-RNN structure with Gated Recurrent Units (GRUs), where the recurrent layers may be preceded by a single linear-projection unit to reduce the dimensionality of the input. In one example, to optimize acoustic model 130, trainer 514 may carry out a grid search over a hyper-parameter space to optimize the model for each experiment, where the space includes, but is not limited to, size of projection layer, size and number of recurrent layers, initial learning rate, momentum, and magnitude of initial random weights.

In addition, speaker independent model 500 may implement a predictor 516 for using acoustic model 130, as trained by trainer 514 under a speaker independent model, to predict prosodic labels for the voice data in held out speaker 522.

In one example, to evaluate the effectiveness of acoustic models trained with original labeled voice samples 110 in speaker train set 520 versus the effectiveness of acoustic models trained with speaker train set 520 as augmented to include labeled augmented voice samples, speaker independent model 500 may establish a baseline 540 in comparison with data augmentation 542. In one example, baseline 540 may include using the original speaker train set to train acoustic model 130, as illustrated at reference numeral 544, using dev 524 to diagnose convergence of acoustic model 130, as illustrated at reference numeral 548, and then evaluating acoustic model 130 using labeled voice samples in held out speaker 522, to detect validation errors, as illustrated at reference numeral 550. In one example, data augmentation 542 may include using the augmented train set to train acoustic model 130, using dev 524 to diagnose convergence of acoustic model 130, and then evaluating acoustic model 130 using labeled voice samples in held out speaker 522, to detect validation errors.

In one example, table 570 illustrates examples of classification errors percentages and differences in classification error percentages, in parenthesis, for baseline 540 versus data augmentation 542, over different speech environment tasks of a phase-boundary (bdry) prediction task and a pitch accent task and using different held out speakers for testing. In one example, data augmentation controller 220 may improve the performance of prosodic labeler 200, by automatically increasing the amount and variety of labeled voice samples in prosodically labeled speech database 114, which in effect, may also improve the performance of a supervised recurrent neural network classifier in speech environment 140 tasked with predicting prosodic-boundary and pitch accent labels.

In one example, the weighted average in table 570 is computed across all speakers, weighted by the number of word tokens in each speaker's dataset. In one example, by applying speaker independent model 500 with both labeled voice samples 110 and labeled augmented voice samples 112, the classification errors in speech environment 140 from the application of acoustic model 130, as validated for a speaker held out from training in held out speaker 522, may be reduced by an average of 8.74% for a phrase-boundary prediction task in speech environment 140 and by an average of 4.75% for a prosodic-prominence task in speech environment 140, when compared against classification errors if only labeled voice samples 110 are used to train acoustic model 130.

Figure 6:
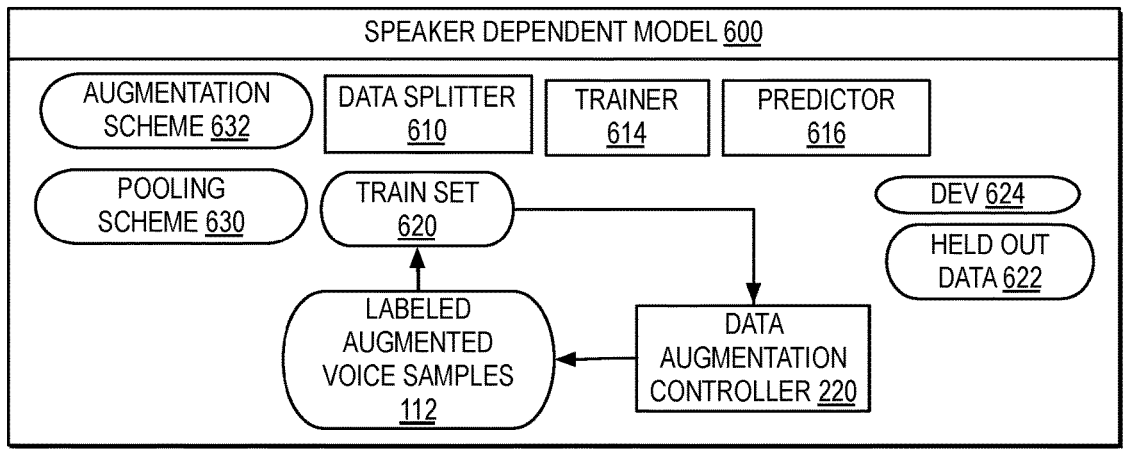
FIG. 6 is a block diagram illustrating one example of phases of a speaker dependent model for training an acoustic model using both prosodic labeled voice samples and prosodic labeled augmented voice samples.

FIG. 6 illustrates a block diagram of one example of phases of a speaker dependent model for training an acoustic model using both prosodic labeled voice samples and prosodic labeled augmented voice samples.

In one example, in considering an example where data augmentation controller 220 applies multiple independent transformations to an original, labeled voice pattern in labeled voice samples 110, to generate an augmented dataset of multiple versions in labeled augmented voice samples 112, speaker dependent model 600 improves the generalization of training in acoustic model 130 in the case of a single-speaker, with limited data for the single speaker.

In one example, speaker dependent model 600 may apply one or more types of schemes, including, but not limited to an augmentation scheme 630, a pooling scheme 632, and a combination of augmentation scheme 630 and pooling scheme 632. For example, in a speaker-dependent case managed by speaker dependent model 600, labeled voice samples 110 may include 3700 utterances from a concatenative speech-synthesis corpus for a single speaker.

In one example, for all schemes, speaker dependent model 600 may implement a data splitter 610 that splits the labeled voice samples from the speaker in labeled voice samples 110 into train set 620, such as 80% of the voice samples, and a dev 624, such as 10% of the samples. In addition, data splitter may also hold out one or more labeled voice samples in held out data 622, such as the remaining 10% of the samples.

In one example, speaker dependent model 600 may then apply data augmentation controller 220 to train set 620 to transform each of the separate training sets of labeled voice samples 110 in train set 620 using one or more transformations, such as the 7 types of transformations illustrated in table 432, into multiple versions of labeled augmented voice samples 112, and merge the multiple versions with each original training set of labeled voice samples in train set 620. In addition, speaker dependent model 600 may apply data augmentation controller 220 to dev 524 to transform each of the labeled voice samples in dev 524 into multiple versions and merge multiple versions with the original voice samples in dev 624. In particular, augmentation controller 220 may create reduced size, nested versions of each of train set 620 and dev 624 at K={5, 10, 20, 40, 60, 80}% of each set's original size to form train set 620 and dev 624, each including labeled augmented voice samples. In one example, held out data 622 is kept at an original size.

In addition, speaker dependent model 600 may implement a trainer 614 for triggering AI training system 120 to train acoustic model 130. In one example, the dev 624 may be applied by trainer 614 to monitor performance and diagnose the quality of training of acoustic model 130 to determine whether additional training is recommended or when to stop training acoustic model 130.

In one example, under augmentation scheme 632, during training of acoustic model 130, trainer 614 may train acoustic model using train set 620, with the reduced size train set data and multiple labeled augmented voice samples that have been transformed by one or more types of transformations. In one example, under pooling scheme 634, during training of acoustic model 130, trainer 614 may train acoustic model on a pooled corpus of the reduced size train set, without augmented voice samples, but pooled with the original multi-speaker train set 520, without augmented voice samples. In one example, under augmentation scheme 632 combined with pooling scheme 630, trainer 614 may train acoustic model using train set 620, with the reduced size train set data and multiple labeled augmented voice samples that have been transformed by one or more types of transformations, pooled with speaker train set 520, with multiple labeled augmented voice samples.

In addition, speaker dependent model 600 may implement a predictor 616 for using acoustic model 130, as trained by trainer 614 under a speaker dependent model, to predict prosodic labels for the voice data in held out data 622.

In one example, to evaluate the effectiveness of acoustic models trained under augmentation scheme 632, pooling scheme 630, or a combination of augmentation scheme 632 and pooling scheme 630, speaker dependent model 600 may establish a baseline 640 in comparison with data augmentation 642. In one example, baseline 640 may include using the original, reduced size speaker train set 620 to train acoustic model 130, as illustrated at reference numeral 644, using dev 624 to diagnose convergence of acoustic model 130, as illustrated at reference numeral 648, and then evaluating acoustic model 130 using labeled voice samples in held out speaker 522, to detect validation errors, as illustrated at reference numeral 650. In one example, data augmentation 542 may include training acoustic model 130 based on the augmentation scheme as illustrated at reference numeral 646, based on the pooling scheme as illustrated at reference numeral 652, or based on the combined augmentation and pooling scheme as illustrated at reference numeral 654, along with the processes illustrated at reference numeral 648 and reference numeral 650.

In one example, table 670 illustrates examples of classification errors percentages and differences in classification error percentages, in parenthesis, for baseline 640 versus data augmentation 642, over different speech environment tasks of a phase-boundary (bdry) prediction task, with a phase boundary error (RER) %, and a pitch accent task, with a pitch accent error (RER) %, and using different sizes of reduced size train sets, for each of the augmentation scheme (DA), the pooling scheme (DP), and the combined augmentation and pooling scheme (DA+P). In one example, the classification error and RER in the speaker-dependent condition is illustrated in table 670 as a function of the amount of training data. In one example, the error results of the augmentation scheme (DA) in table 670 may reflect how data augmentation by data augmentation controller 220 alone can improve generalization to a known target speaker as function of limited training data. In one example, the error results of the pooling scheme (DP) in table 670 may reflect how data pooling from independent sources can help to generalize a known target speaker of interest, as a function of limited training data. In one example, the error results of the combined augmentation and pooling scheme (DA+P) in table 670 may reflect how both data augmentation, as well as data pooling from independent sources, may improve generalization to a known target speaker, as a function of limited training data, assuming that there is access to external sources of data for pooling and data augmentation controller 220.

As illustrated by the percentages in table 670, when applying speaker dependent model 600, pooling scheme 630, by itself, is not as reliable as augmentation scheme 632, and this difference is most noticeable for phrase boundary error tasks. In addition, as illustrated by the percentages in table 670, when applying speaker dependent model 600, the combination of augmentation scheme 632 with pooling scheme 630 provides the best performance than either scheme alone, and this improvement is most noticeable for the full train set size of 100%.

Figure 7:
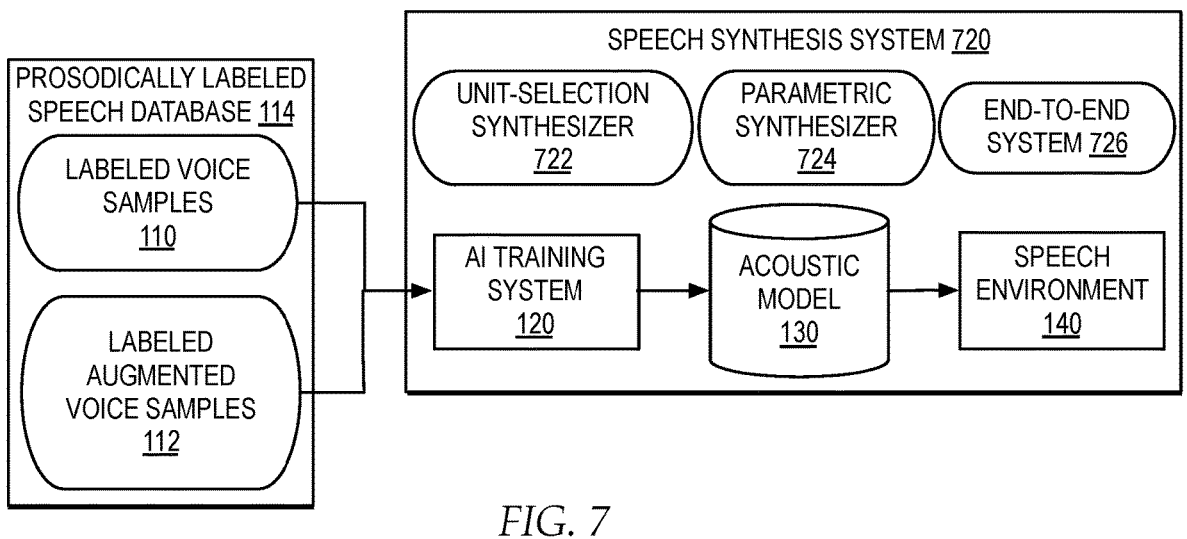
FIG. 7 is a block diagram illustrating one example of one or more types of speech synthesis systems that exploit an unlabeled corpus that are improved by using training sets from a prosodically labeled speech database that includes prosodic labeled voice samples and prosodic labeled augmented voice samples.

FIG. 7 illustrates a block diagram of one example of one or more types of speech synthesis systems that exploit an unlabeled corpus that are improved by using training sets from a prosodically labeled speech database that includes prosodic labeled voice samples and prosodic labeled augmented voice samples.

In one example, AI training system 120, acoustic model 130, and speech environment 140 may be components of or support one or more types of speech synthesis systems, such as speech synthesis system 720. In one example, speech synthesis system 720 may artificially create human speech by converting text into a speech wave form that is output as audio in the form of speech.

In one example, by creating prosodically labeled speech database 114 that includes both labeled voice samples 110 and labeled augmented voice samples 112, the training system of AI training system 120 may improve the quality of prosodic labeling trained in acoustic model 130, for building acoustic models 130 that perform more accurately in speech environment 140, within speech synthesis system 720. In particular, in examples where speech synthesis system 720 exploits an unlabeled corpus in some way, by AI training system 120 applying both labeled voice samples 110 and labeled augmented voice sample 112 as training data for acoustic model 130, the quality of prosodic labeling performed in speech environment 140 may be improved over systems that only implement labeled voice samples 110, to obtain more accurate prosodic tags for an unlabeled corpus based on the more robust training of data in acoustic model 130.

In one example, speech synthesis system 720 may implement a unit-selection synthesizer 722. In one example, unit-synthesis synthesizer 722 may provide text to voice synthesis by synthesizing naturally sounding utterances by selecting sub-word units from a database of natural speech trained in acoustic model 130. For example, unit-selection synthesizer 722 may build an audio sentence from textual words, where the original corpus of unlabeled voice data is large, but is chopped into small units and sub units. In building the audio sentence, unit-selection synthesizer may search acoustic model 130 for sub-word units that came from a similar context as the current context, based on a prosodic label, such as a similar emphasis. In one example, by increasing the amount and variety of training data in prosodically labeled speech database 114 through labeled augmented voice samples 112, the number of subwords and utterances per subword trained in acoustic model 130 may be improved over a system in which only a smaller corpus of labeled voice samples 110 is available. In one example, unit-selection synthesizer 710 may exploit the amount and variety of prosodic information used to train acoustic model 130 in its search algorithms for sub-word units by finding better prosodic matches in the unit inventory in acoustic model 130.

In one example, speech synthesis system 720 may implement a parametric synthesizer 724. In one example, parametric synthesizer 724 may provide text to voice synthesis through statistical parametric speech synthesis, such as hidden Markov model (HMM)-based speech synthesis in which the system being modeled is assumed to be a Markov process with unobserved, or hidden, states. In one example, by increasing the amount and variety of training data in prosodically labeled speech database 114 through labeled augmented voice samples 112, parametric synthesizer 724 may exploit the increased amount and variety of prosodic features available in prosodically labeled speech database 114 for building an HMM model-based system. In particular, parametric synthesizer 724 is a data drive system that may apply absorb prosodically labeled speech database 114 into an HMM statistical model, exploiting the labeled attributes of the data, and then discard the data in prosodically labeled speech database 114. In one example, the HMM statistical model may modularize the synthesis of text into speech, through components that apply the HMM model to direct how to pronounce a word, assign phrasing, identify patterns of prominence, identify whether the word is a verb or a noun, and identify prosodic patterns, which produces the acoustic pattern in speech.

In one example, speech synthesis system 720 may implement an end-to-end synthesizer 726. In one example, end-to-end synthesizer 726 may provide text to voice synthesis through a reader in a Bi-RNN that encodes text inputs and decodes the text as audio waveforms, producing audio directly from text. In one example, the end-to-end synthesizer 726 may depend on prosodic labels or other types of mark-up information provided by users, such as "make this word more salient", in labeled voice samples 110. The overall quality of text to speech synthesis by end-to-end synthesizer 726 may be improved by converting text inputs to speech based on acoustic model 130 as trained by both labeled voice samples 110 that are user-guided and labeled augmented voice samples 112 that are replicated from labeled voice samples 110 with transformations. End-to-end synthesizer 726 may try to minimize sub processes, by aligning second by second to the text that needs to be read, in order to learn simultaneously what the audio should sound like for text and know which text it aligns with.

Figure 8:
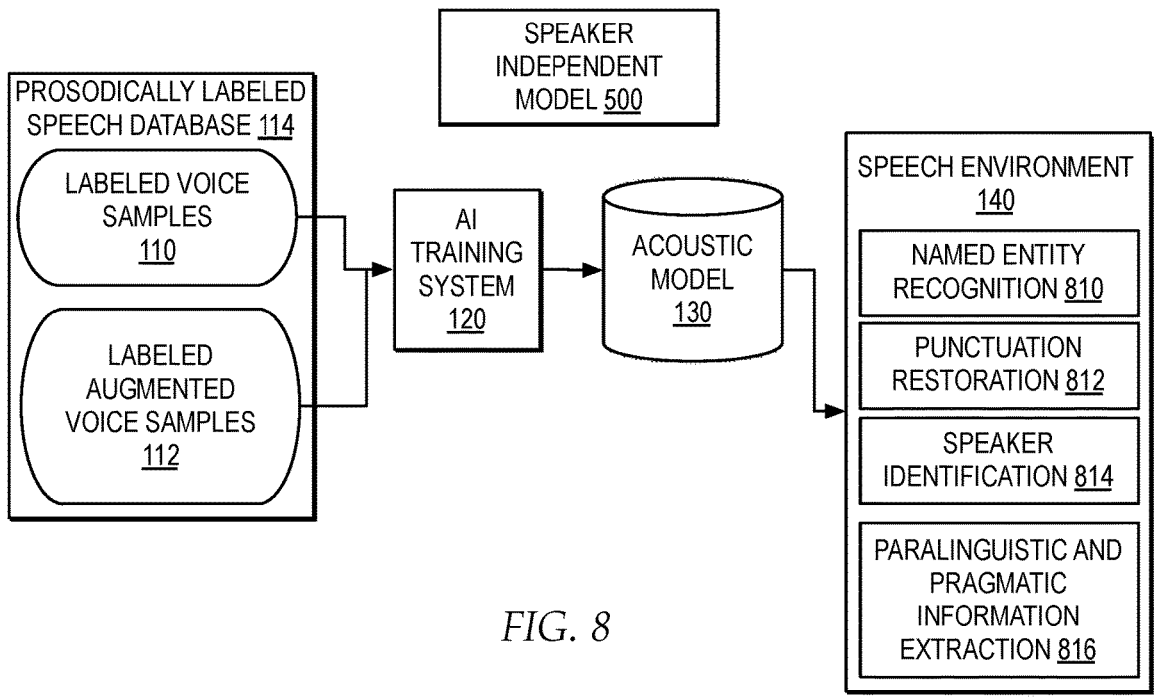
FIG. 8 is a block diagram illustrating one example of types of speech environments in which a speaker independent model of training an acoustic model based on prosodic labeling is more accurate when training data includes prosodic labeled voice samples and prosodic labeled augmented voice samples.

FIG. 8 illustrates a block diagram of one example of types of speech environments in which a speaker independent model of training an acoustic model based on prosodic labeling is more accurate when training data includes prosodic labeled voice samples and prosodic labeled augmented voice samples.

In one example, speaker independent model 500 may be implemented to improve the accuracy of speech applications within speech environment 140 in one more types of spoken language processing tasks including, but not limited to, named entity recognition 810, punctuation restoration 812, speaker identification 814, and paralinguistic and pragmatic information extraction 816. In one example, by increasing the amount and variety of training data used to train acoustic model 130 under speaker independent model 500, the quality and accuracy of downstream tasks in speech environment 140 that rely on prosodic labeling, will be improved.

Figure 9:
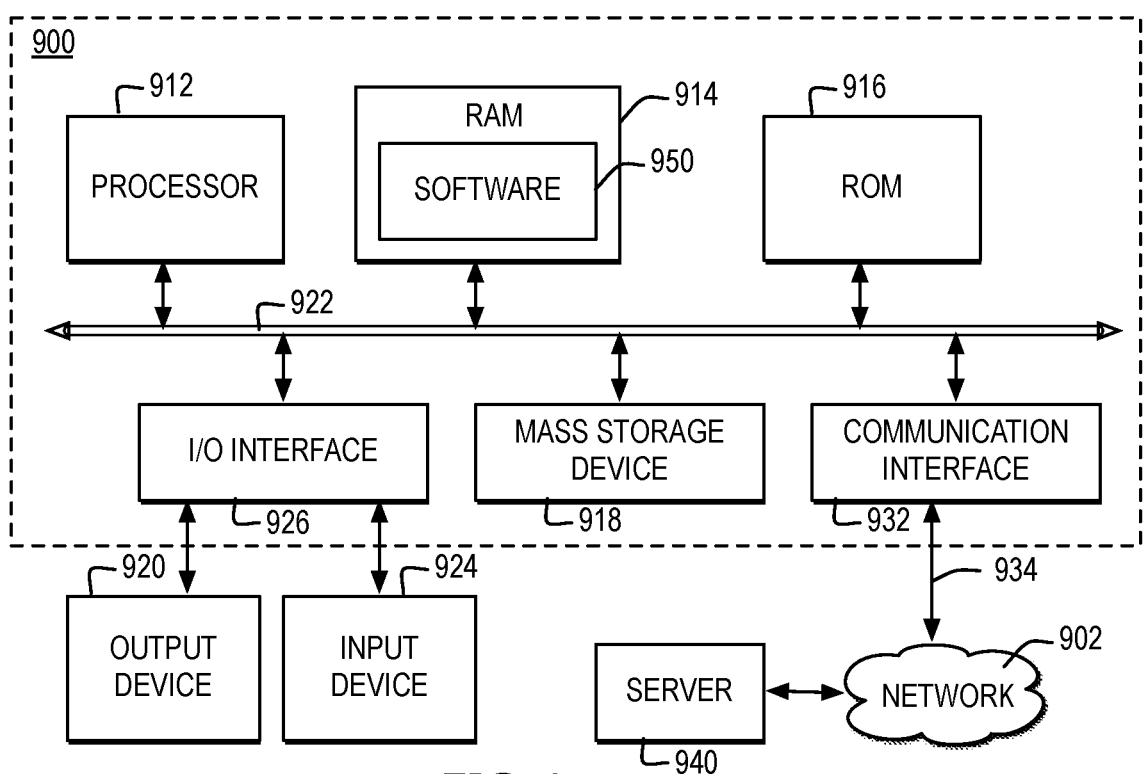
FIG. 9 is a block diagram illustrating one example of a computer system in which one embodiment of the invention may be implemented.

FIG. 9 illustrates a block diagram of one example of a computer system in which one embodiment of the invention may be implemented. The present invention may be performed in a variety of systems and combinations of systems, made up of functional components, such as the functional components described with reference to a computer system 900 and may be communicatively connected to a network, such as network 902.

Computer system 900 includes a bus 922 or other communication device for communicating information within computer system 900, and at least one hardware processing device, such as processor 912, coupled to bus 922 for processing information. Bus 922 preferably includes low-latency and higher latency paths that are connected by bridges and adapters and controlled within computer system 900 by multiple bus controllers. When implemented as a server or node, computer system 900 may include multiple processors designed to improve network servicing power.

Processor 912 may be at least one general-purpose processor that, during normal operation, processes data under the control of software 950, which may include at least one of application software, an operating system, middleware, and other code and computer executable programs accessible from a dynamic storage device such as random access memory (RAM) 914, a static storage device such as Read Only Memory (ROM) 916, a data storage device, such as mass storage device 918, or other data storage medium. Software 950 may include, but is not limited to, code, applications, protocols, interfaces, and processes for controlling one or more systems within a network including, but not limited to, an adapter, a switch, a server, a cluster system, and a grid environment.

Computer system 900 may communicate with a remote computer, such as server 940, or a remote client. In one example, server 940 may be connected to computer system 900 through any type of network, such as network 902, through a communication interface, such as network interface 932, or over a network link that may be connected, for example, to network 902.

In the example, multiple systems within a network environment may be communicatively connected via network 902, which is the medium used to provide communications links between various devices and computer systems communicatively connected. Network 902 may include permanent connections such as wire or fiber optics cables and temporary connections made through telephone connections and wireless transmission connections, for example, and may include routers, switches, gateways and other hardware to enable a communication channel between the systems connected via network 902. Network 902 may represent one or more of packet-switching based networks, telephony based networks, broadcast television networks, local area and wire area networks, public networks, and restricted networks.

Network 902 and the systems communicatively connected to computer 900 via network 902 may implement one or more layers of one or more types of network protocol stacks which may include one or more of a physical layer, a link layer, a network layer, a transport layer, a presentation layer, and an application layer. For example, network 902 may implement one or more of the Transmission Control Protocol/Internet Protocol (TCP/IP) protocol stack or an Open Systems Interconnection (OSI) protocol stack. In addition, for example, network 902 may represent the worldwide collection of networks and gateways that use the TCP/IP suite of protocols to communicate with one another. Network 902 may implement a secure HTTP protocol layer or other security protocol for securing communications between systems.

In the example, network interface 932 includes an adapter 934 for connecting computer system 900 to network 902 through a link and for communicatively connecting computer system 900 to server 940 or other computing systems via network 902. Although not depicted, network interface 932 may include additional software, such as device drivers, additional hardware and other controllers that enable communication. When implemented as a server, computer system 900 may include multiple communication interfaces accessible via multiple peripheral component interconnect (PCI) bus bridges connected to an input/output controller, for example. In this manner, computer system 900 allows connections to multiple clients via multiple separate ports and each port may also support multiple connections to multiple clients.

In one embodiment, the operations performed by processor 912 may control the operations of flowchart of FIGS. 10-14 and other operations described herein. Operations performed by processor 912 may be requested by software 950 or other code or the steps of one embodiment of the invention might be performed by specific hardware components that contain hardwired logic for performing the steps, or by any combination of programmed computer components and custom hardware components. In one embodiment, one or more components of computer system 900, or other components, which may be integrated into one or more components of computer system 900, may contain hardwired logic for performing the operations of flowcharts in FIGS. 10-14.

In addition, computer system 900 may include multiple peripheral components that facilitate input and output. These peripheral components are connected to multiple controllers, adapters, and expansion slots, such as input/output (I/O) interface 926, coupled to one of the multiple levels of bus 922. For example, input device 924 may include, for example, a microphone, a video capture device, an image scanning system, a keyboard, a mouse, or other input peripheral device, communicatively enabled on bus 922 via I/O interface 926 controlling inputs. In addition, for example, output device 920 communicatively enabled on bus 922 via I/O interface 926 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 9, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 9 may vary. Furthermore, those of ordinary skill in the art will appreciate that the depicted example is not meant to imply architectural limitations with respect to the present invention.

Figure 10:
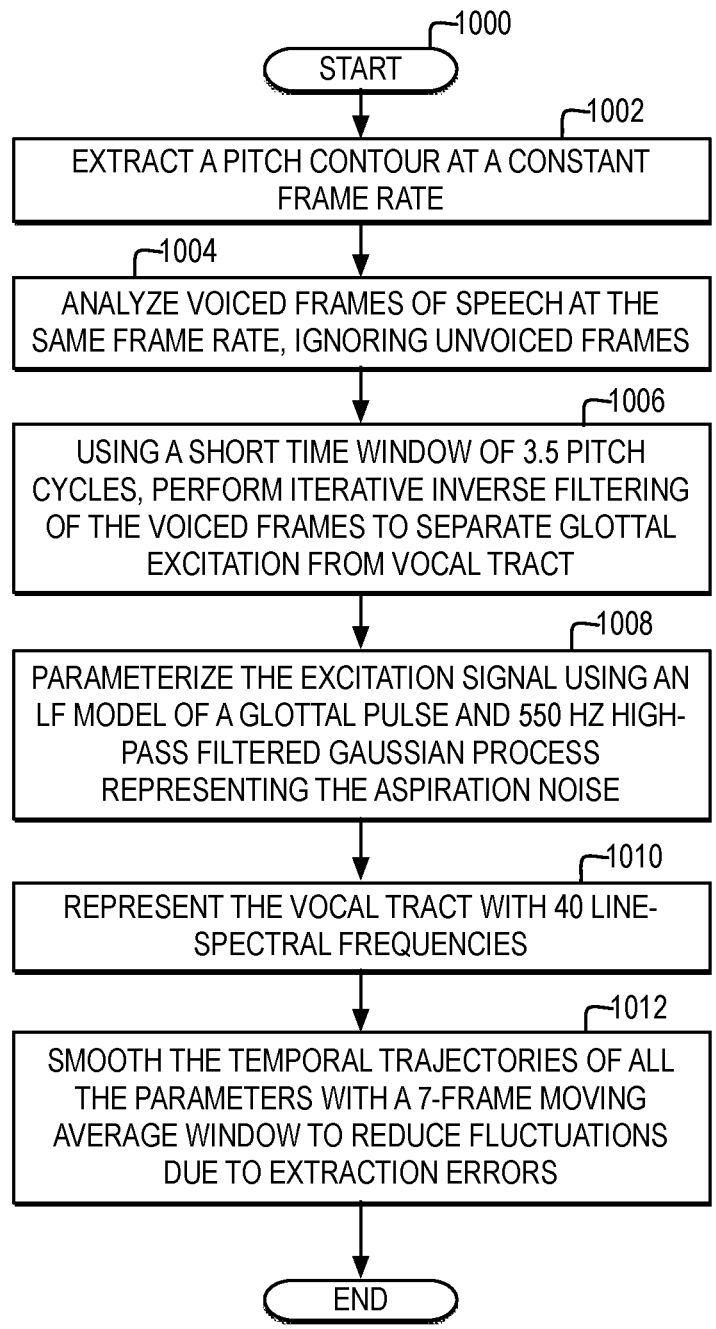
FIG. 10 is a high-level logic flowchart illustrating a process and computer program for controlling analysis of prosodic labeled voice samples to automatically create additional prosodic labeled augmented voice samples.

FIG. 10 illustrates a high-level logic flowchart of a process and computer program for controlling analysis of prosodic labeled voice samples to automatically create additional prosodic labeled augmented voice samples.

In one example, the process and computer program start at block 1000 and thereafter proceeds to block 1002. Block 1002 illustrates extracting a pitch contour from the voice data at a constant frame rate. Block 1004 illustrates analyzing voiced frames of speech in the voice data at the same frame rate, ignoring unvoiced frames. Next, block 1006 illustrates using a short time window of 3.5 pitch cycles, performing iterative inverse filtering of the voiced frames to separate glottal excitation from vocal tract. Thereafter, block 1008 illustrates parameterizing the excitation signal using an LF model of a glottal pulse and 550 HZ high-pass filtered Gaussian process representing the aspiration noise. Next, block 1010 illustrates representing the vocal tract with 40 line-spectral frequencies. Thereafter, block 1012 depicts smoothing the temporal trajectories of all the parameters with a 7-frame moving average window to reduce fluctuations due to extraction errors, and the process ends.

Figure 11:
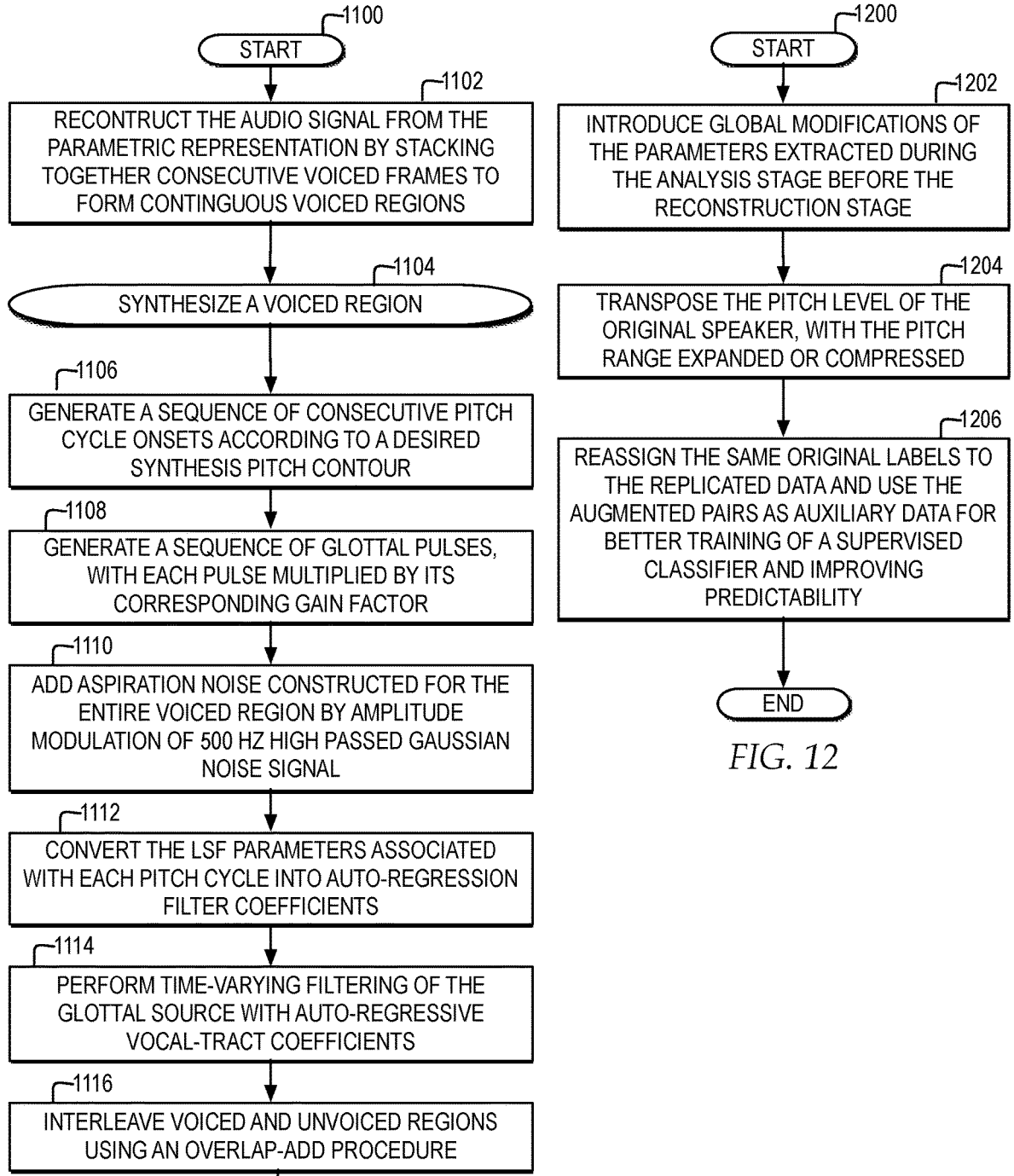
FIG. 11 is a high-level logic flowchart illustrating a process and computer program for controlling reconstruction of analyzed prosodic labeled voice samples to automatically create additional prosodic labeled augmented voice samples.

FIG. 11 illustrates a high-level logic flowchart of a process and computer program for controlling reconstruction of analyzed prosodic labeled voice samples to automatically create additional prosodic labeled augmented voice samples.

In one example, the process and computer program start at block 1100 and thereafter proceeds to block 1102. Block 1102 illustrates reconstructing the audio signal from the parametric representation by stacking together consecutive voiced frames to form contiguous voiced regions. Next, a phase is performed to synthesize as voiced region, as illustrated at reference numeral 1104. In the phase synthesis phase, block 1106 illustrates generating a sequence of consecutive pitch cycle onsets according to a desired synthesis pitch contour. Next, block 1108 illustrates generating a sequence of glottal pulses, with each pulse multiplied by its corresponding gain factor. Thereafter, block 1110 illustrates adding aspiration noise constructed for the entire voiced region by amplitude modulation of a 500 Hz high passed Gaussian noise signal. Next, block 1112 illustrates converting the LSF parameters associated with each pitch cycle into auto-regression filter coefficients. Thereafter, block 1114 illustrates performing time-varying filtering of the glottal source with auto-regressive vocal tract coefficients. Next, block 1116 illustrates interleaving voiced and unvoiced regions using an overall-add procedure, and the process ends.

Figure 12:
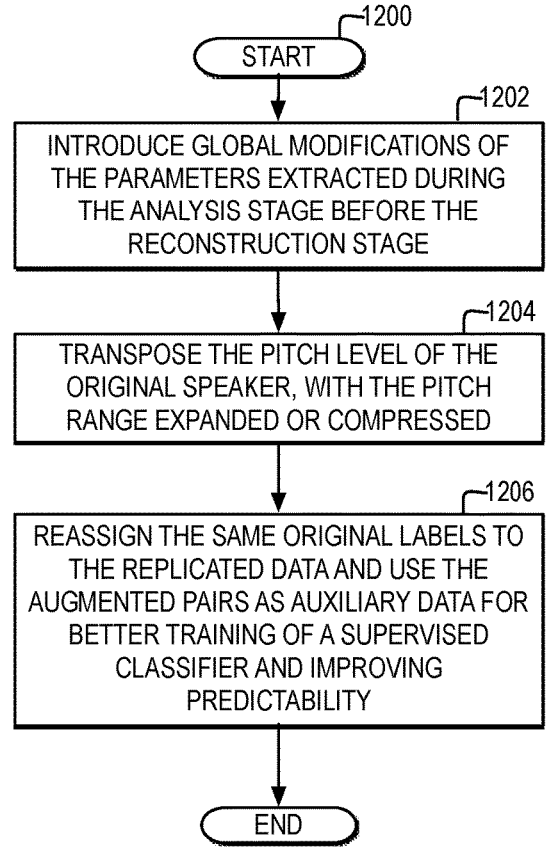
FIG. 12 is a high-level logic flowchart illustrating a process and computer program for controlling transformation of analyzed and reconstructed prosodic labeled voice samples to automatically create additional prosodic labeled augmented voice samples.

FIG. 12 illustrates a high-level logic flowchart of a process and computer program for controlling transformation of analyzed and reconstructed prosodic labeled voice samples to automatically create additional prosodic labeled augmented voice samples.

In one example, the process and computer program start at block 1200 and thereafter proceeds to block 1202. Block 1202 illustrates introducing global modifications of the parameters extracted during the analysis stage in FIG. 10, before the reconstruction stage, in FIG. 11. Next, block 1204 illustrates transposing the pitch level of the original speaker, with the pitch range expanded or compressed. Thereafter, block 1206 illustrates reassigning the same original labels to the replicated data and using the augmented pairs as auxiliary data for better training of a supervised classifier and improved predictability, and the process ends.

FIG. 13 illustrates a high-level logic flowchart of a process and computer program for controlling a speaker independent trained acoustic model using prosodic labeled voice samples and prosodic labeled augmented voice samples.

In one example, the process and computer program start at block 1300 and thereafter proceeds to block 1302. Block 1302 illustrates splitting the labeled voice sample data from each available speaker, of multiple available speakers, into a speaker train set and dev, holding out the labeled voice sample data from one speaker. Next, block 1304 illustrates transforming each of the training sets into multiple transformations of labeled augmented voice samples and merging the augmented versions with the original speaker train set in the prosodically labeled speech database. Thereafter, block 1306 illustrates using the merged speaker train set to train an acoustic model, applying the dev to detect convergence. Next, block 1308 illustrates for validation, using the trained acoustic model to predict prosodic labels for voice samples from the speaker data held out from training, and the process ends.

FIG. 14 illustrates a high-level logic flowchart of a process and computer program for controlling a speaker dependent trained acoustic model using prosodic labeled voice samples and prosodic labeled augmented voice samples.

In one example, the process and computer program start at block 1400 and thereafter proceeds to block 1402. Block 1402 illustrates splitting the labeled voice sample data from the speaker into a train set, dev and held data. Next, block 1404 illustrates creating a reduced size version of the train set and dev. Thereafter, block 1406 illustrates transforming each of the train sets into multiple transformations of labeled augmented vice samples and merging the versions with the reduced size train set in the prosodically labeled speech database. Thereafter, block 1408 illustrates using the merged training set to train an acoustic model, applying the dev to detect convergence. Next, block 1410 illustrates for validation, using the trained acoustic model to predict prosodic labels for voice samples from the selection of data held out from training, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
    receiving, by a computer system, a training set of voice data captured from one or more speakers and classified with one or more categorical prosodic labels according to one or more prosodic categories;
    transforming, by the computer system, the voice data of the training set while preserving one or more portions of the voice data that determine the one or more categorical prosodic labels to automatically form a new training set of voice data automatically classified with the one or more categorical prosodic labels according to the one or more prosodic categories by:
        extracting, by the computer system, a pitch contour from the voice data at a constant frame rate;
        analyzing, by the computer system, one or more voiced frames of the voice data at the constant frame rate while ignoring unvoiced frames;
        using, by the computer system, a short time window to perform iterative inverse filtering of the one or more voiced frames to separate glottal excitation from vocal tract in one or more voiced regions;

parameterizing, by the computer system, the glottal excitation using a model of a glottal pulse and a high-pass filtered Gaussian process representing aspiration noise; and smoothing, by the computer system, one or more temporal trajectories of one or more parameters of the parameterized glottal excitation within a moving average window to reduce fluctuations due to extraction errors; and augmenting, by the computer system, a database comprising the training set with the new training set for training a speech model of an artificial intelligence system.

2. The method according to claim 1, further comprising:

transforming, by the computer system, the voice data by performing an acoustical transformation of one or more of a fundamental frequency, a speaker vocal tract, or voice quality; and preserving, by the computer system, the one or more portions of the voice data that determined the one or more categorical prosodic labels by preserving one or more local patterns of prominence and phrasing within the voice data.

3. The method according to claim 1, further comprising:

applying, by the computer system, one or more global modifications of the parameterized glottal excitation to transpose a pitch level in the voice data with a pitch range that is either expanded or compressed.

4. The method according to claim 3, further comprising reconstructing the voice data from the parameterized glottal excitation by stacking together, by the computer system, one or more consecutive voiced frames within the voice data to form one or more contiguous voiced regions;

synthesizing, by the computer system, the one or more contiguous voiced regions by:

generating, by the computer system, a sequence of consecutive pitch cycle onsets according to a synthesis pitch contour;

generating, by the computer system, a sequence of glottal pulses, with each of the sequence of glottal pulses multiplied by a corresponding factor;

adding, by the computer system, aspiration noise constructed for the one or more contiguous voiced regions by amplitude modulation of a high passed Gaussian noise signal;

converting, by the computer system, the one or more parameters associated with each of the sequence of consecutive pitch cycle onset in the one or more contiguous voiced regions into auto-regression filter coefficients;

performing, by the computer system, time-varying filtering of the sequence of glottal pulses with one or more auto-regressive vocal-tract coefficients;

interleaving, by the computer system, the one or more contiguous voiced regions and one or more unvoiced frames using an overlap add procedure; and forming, by the computer system, the new training set of voice data from an interleaved one or more contiguous voiced regions with one or more unvoiced regions with the same one or more categorical prosodic labels.

5. The method according to claim 1, further comprising:

applying, by the computer system, the database comprising the training set and the new training set to train the speech model for performing text to voice synthesis by the artificial intelligence system, wherein the text to voice synthesis is performed by one or more of a unit-selection synthesizer, a parametric synthesizer, or an end-to-end system.

6. The method according to claim 1, further comprising:

splitting, by the computer system, the voice data of the training set from a first selection of the one or more speakers into the training set and a dev set, the one or more speakers comprising a plurality of speakers;

splitting, by the computer system, the voice data from a second selection of the one or more speakers into a held out set, transforming, by the computer system, the voice data of the training set while preserving the one or more portions of the voice data that determined the one or more categorical prosodic labels to automatically form the new training set of voice data classified with the one or more categorical prosodic labels for the one or more prosodic categories;

augmenting, by the computer system, the database comprising the training set with the new training set for training the speech model of the artificial intelligence system;

applying, by the computer system, the dev set while training the speech model to detect convergence; and validating, by the computer system, the speech model by applying the held out set to the speech model.

7. The method according to claim 1, further comprising:

splitting, by the computer system, the voice data of the training set into the training set, a dev set, and a held out set, the one or more speakers comprising a speaker;

reducing, by the computer system, a number of entries in the training set and the dev set;

transforming, by the computer system, the voice data of the training set while preserving the one or more portions of the voice data that determined the one or more categorical prosodic labels to automatically form the new training set of voice data classified with the one or more categorical prosodic labels for the one or more prosodic categories;

augmenting, by the computer system, the database comprising the training set with the new training set for training the speech model of the artificial intelligence system;

applying, by the computer system, the dev set while training the speech model to detect convergence; and validating, by the computer system, the speech model by applying the held out set to the speech model.

8. A computer system for managing a relational database, the computer system comprising:

one or more processors, one or more computer-readable memories and one or more computer-readable, tangible storage devices;

program instructions, stored on at least one of the one or more tangible storage devices for execution by at least one of the one or more processors via at least one of the one or more computer-readable memories, to receive a training set of voice data captured from one or more speakers and classified with one or more categorical prosodic labels according to one or more prosodic categories;

program instructions, stored on at least one of the one or more tangible storage devices for execution by at least one of the one or more processors via at least one of the one or more computer-readable memories, to transform the voice data of the training set while preserving one or more portions of the voice data that determine the one or more categorical prosodic labels to automatically form a new training set of voice data automatically classified with the one or more categorical prosodic labels according to the one or more prosodic categories by:
program instructions, stored on at least one of the one or more tangible storage devices for execution by at least one of the one or more processors via at least one of the one or more computer-readable memories, to extract a pitch contour from the voice data at a constant frame rate;
program instructions, stored on at least one of the one or more tangible storage devices for execution by at least one of the one or more processors via at least one of the one or more computer-readable memories, to analyze one or more voiced frames of the voice data at the constant frame rate while ignoring unvoiced frames;
program instructions, stored on at least one of the one or more tangible storage devices for execution by at least one of the one or more processors via at least one of the one or more computer-readable memories, to use a short time window to perform iterative inverse filtering of the one or more voiced frames to separate glottal excitation from vocal tract in one or more voiced regions;
program instructions, stored on at least one of the one or more tangible storage devices for execution by at least one of the one or more processors via at least one of the one or more computer-readable memories, to parameterize the glottal excitation using a model of a glottal pulse and a high-pass filtered Gaussian process representing aspiration noise; and
program instructions, stored on at least one of the one or more tangible storage devices for execution by at least one of the one or more processors via at least one of the one or more computer-readable memories, to smooth one or more temporal trajectories of one or more parameters of the parameterized glottal excitation within a moving average window to reduce fluctuations due to extraction errors; and
program instructions, stored on at least one of the one or more tangible storage devices for execution by at least one of the one or more processors via at least one of the one or more computer-readable memories, to augment a database comprising the training set with the new training set for training a speech model of an artificial intelligence system.

9. The computer system according to claim 8, further comprising:
program instructions, stored on at least one of the one or more tangible storage devices for execution by at least one of the one or more processors via at least one of the one or more computer-readable memories, to transform the voice data by performing an acoustical transformation of one or more of a fundamental frequency, a speaker vocal tract, or voice quality; and
program instructions, stored on at least one of the one or more tangible storage devices for execution by at least one of the one or more processors via at least one of the one or more computer-readable memories, to preserve the one or more portions of the voice data that determined the one or more categorical prosodic labels by preserving one or more local patterns of prominence and phrasing within the voice data.

10. The computer system according to claim 8, further comprising:
program instructions, stored on at least one of the one or more tangible storage devices for execution by at least one of the one or more processors via at least one of the one or more computer-readable memories, to apply one or more global modifications of the parameterized glottal excitation to transpose a pitch level in the voice data with a pitch range that is either expanded or compressed.

11. The computer system according to claim 10, further comprising:
program instructions, stored on at least one of the one or more tangible storage devices for execution by at least one of the one or more processors via at least one of the one or more computer-readable memories, to reconstruct the voice data from the parameterized glottal excitation by stacking together, by the computer system, one or more consecutive voiced frames within the voice data to form one or more contiguous voiced regions;
program instructions, stored on at least one of the one or more tangible storage devices for execution by at least one of the one or more processors via at least one of the one or more computer-readable memories, to synthesize the one or more contiguous voiced regions by:
program instructions, stored on at least one of the one or more tangible storage devices for execution by at least one of the one or more processors via at least one of the one or more computer-readable memories, to generate a sequence of consecutive pitch cycle onsets according to a synthesis pitch contour;
program instructions, stored on at least one of the one or more tangible storage devices for execution by at least one of the one or more processors via at least one of the one or more computer-readable memories, to generate a sequence of glottal pulses, with each of the sequence of glottal pulses multiplied by a corresponding factor;
program instructions, stored on at least one of the one or more tangible storage devices for execution by at least one of the one or more processors via at least one of the one or more computer-readable memories, to add aspiration noise constructed for the one or more contiguous voiced regions by amplitude modulation of a high passed Gaussian noise signal;
program instructions, stored on at least one of the one or more tangible storage devices for execution by at least one of the one or more processors via at least one of the one or more computer-readable memories, to convert the one or more parameters associated with each of the sequence of consecutive pitch cycle onsets in the one or more contiguous voiced regions into auto-regression filter coefficients;
program instructions, stored on at least one of the one or more tangible storage devices for execution by at least one of the one or more processors via at least one of the one or more computer-readable memories, to perform time-varying filtering of the sequence of glottal pulses with one or more auto-regressive vocal-tract coefficients;
program instructions, stored on at least one of the one or more tangible storage devices for execution by at least one of the one or more processors via at least one of the one or more computer-readable memories, to interleave one or more contiguous voiced regions and the one or more unvoiced frames using an overlap add procedure; and program instructions, stored on at least one of the one or more tangible storage devices for execution by at least one of the one or more processors via at least one of the one or more computer-readable memories, to form the new training set of voice data from an interleaved one or more contiguous voiced regions with the one or more unvoiced regions with the same one or more categorical prosodic labels.

12. The computer system according to claim 8, further comprising:
program instructions, stored on at least one of the one or more tangible storage devices for execution by at least one of the one or more processors via at least one of the one or more computer-readable memories, to apply the database comprising the training set and the new training set to train the speech model for performing text to voice synthesis by the artificial intelligence system, wherein the text to voice synthesis is performed by one or more of a unit-selection synthesizer, a parametric synthesizer, or an end-to-end system.

13. The computer system according to claim 8, further comprising:
program instructions, stored on at least one of the one or more tangible storage devices for execution by at least one of the one or more processors via at least one of the one or more computer-readable memories, to split the voice data of the training set from a first selection of the one or more speakers into the training set and a dev set, the one or more speakers comprising a plurality of speakers;
program instructions, stored on at least one of the one or more tangible storage devices for execution by at least one of the one or more processors via at least one of the one or more computer-readable memories, to split the voice data from a second selection of the one or more speakers into a held out set,
program instructions, stored on at least one of the one or more tangible storage devices for execution by at least one of the one or more processors via at least one of the one or more computer-readable memories, to transform the voice data of the training set while preserving the one or more portions of the voice data that determined the one or more categorical prosodic labels to automatically form the new training set of voice data classified with the one or more categorical prosodic labels for the one or more prosodic categories;
program instructions, stored on at least one of the one or more tangible storage devices for execution by at least one of the one or more processors via at least one of the one or more computer-readable memories, to augment the database comprising the training set with the new training set for training the speech model of the artificial intelligence system;
program instructions, stored on at least one of the one or more tangible storage devices for execution by at least one of the one or more processors via at least one of the one or more computer-readable memories, to apply the dev set while training the speech model to detect convergence; and
program instructions, stored on at least one of the one or more tangible storage devices for execution by at least one of the one or more processors via at least one of the one or more computer-readable memories, to validate the speech model by applying the held out set to the speech model.

14. The computer system according to claim 8, further comprising:
program instructions, stored on at least one of the one or more tangible storage devices for execution by at least one of the one or more processors via at least one of the one or more computer-readable memories, to split the voice data of the training set into the training set, a dev set, and a held out set, the one or more speakers comprising a speaker;
program instructions, stored on at least one of the one or more tangible storage devices for execution by at least one of the one or more processors via at least one of the one or more computer-readable memories, to reduce a number of entries in the training set and the dev set;
program instructions, stored on at least one of the one or more tangible storage devices for execution by at least one of the one or more processors via at least one of the one or more computer-readable memories, to transform the voice data of the training set while preserving the one or more portions of the voice data that determined the one or more categorical prosodic labels to automatically form the new training set of voice data classified with the one or more categorical prosodic labels for the one or more prosodic categories;
program instructions, stored on at least one of the one or more tangible storage devices for execution by at least one of the one or more processors via at least one of the one or more computer-readable memories, to augment the database comprising the training set with the new training set for training the speech model of the artificial intelligence system;
program instructions, stored on at least one of the one or more tangible storage devices for execution by at least one of the one or more processors via at least one of the one or more computer-readable memories, to apply the dev set while training the speech model to detect convergence; and
program instructions, stored on at least one of the one or more tangible storage devices for execution by at least one of the one or more processors via at least one of the one or more computer-readable memories, to validate the speech model by applying the held out set to the speech model.

15. A computer program product comprises a computer readable storage medium having program instructions embodied therewith, wherein the computer readable storage medium is not a transitory signal per se, the program instructions executable by a computer to cause the computer to:
receive, by a computer, a training set of voice data captured from one or more speakers and classified with one or more categorical prosodic labels according to one or more prosodic categories;
transform, by the computer, the voice data of the training set while preserving one or more portions of the voice data that determine the one or more categorical prosodic labels to automatically form a new training set of voice data automatically classified with the one or more categorical prosodic labels according to the one or more prosodic categories by:
extracting a pitch contour from the voice data at a constant frame rate;
analyzing one or more voiced frames of the voice data at the constant frame rate while ignoring unvoiced frames;

using a short time window to perform iterative inverse filtering of the one or more voiced frames to separate glottal excitation from vocal tract in one or more voiced regions;

parameterizing the glottal excitation using a model of a glottal pulse and a high-pass filtered Gaussian process representing aspiration noise; and smoothing one or more temporal trajectories of one or more parameters of the parameterized glottal excitation within a moving average window to reduce fluctuations due to extraction errors; and augment, by the computer, a database comprising the training set with the new training set for training a speech model of an artificial intelligence system.

16. The computer program product according to claim 15, further comprising the program instructions executable by a computer to cause the computer to:

transform, by the computer, the voice data by performing an acoustical transformation of one or more of a fundamental frequency, a speaker vocal tract, or voice quality; and preserve, by the computer, the one or more portions of the voice data that determined the one or more categorical prosodic labels by preserving one or more local patterns of prominence and phrasing within the voice data.

* * * * *